(12) United States Patent
Edens et al.

(10) Patent No.: US 6,435,410 B2
(45) Date of Patent: Aug. 20, 2002

(54) SYSTEM AND METHOD FOR REGISTRATION OF DOCUMENTS BY MARKING AND REGISTRATION OF MARKINGS

(75) Inventors: Bertus Karel Edens, Drachten; Gerhard Hidding, Heerenveen, both of (NL)

(73) Assignee: Neopost B.V., Drachten (NL)

(*) Notice: Subject to any disclaimer, the term of this patent is extended or adjusted under 35 U.S.C. 154(b) by 0 days.

(21) Appl. No.: 09/223,632

(22) Filed: Dec. 31, 1998

(30) Foreign Application Priority Data

Dec. 31, 1997 (NL) .............................................. 1007944

(51) Int. Cl.[7] .............................. G06K 7/10; G06K 7/14
(52) U.S. Cl. ......................... 235/454; 235/380; 235/375
(58) Field of Search ................................. 235/375, 380, 235/454

(56) References Cited

U.S. PATENT DOCUMENTS

| | | | |
|---|---|---|---|
| 3,890,599 A | | 6/1975 | Simjian |
| 4,791,281 A | | 12/1988 | Johnsen et al. |
| 4,800,504 A | * | 1/1989 | Durst, Jr. et al. ........ 235/375 X |
| 5,336,034 A | | 8/1994 | Hidding |
| 5,717,596 A | | 2/1998 | Bernard et al. |
| 5,822,738 A | | 10/1998 | Shah et al. |
| 5,822,739 A | * | 10/1998 | Kara ........................ 235/375 X |
| 5,886,334 A | * | 3/1999 | D'Entremont et al. ...... 235/380 |
| 5,925,864 A | * | 7/1999 | Sansone et al. ............. 235/375 |
| 6,039,257 A | * | 3/2000 | Berson et al. .......... 235/375 X |
| 6,050,486 A | * | 4/2000 | French et al. ........... 235/375 X |

FOREIGN PATENT DOCUMENTS

| | | |
|---|---|---|
| EP | 0 516 403 | 12/1992 |
| EP | 0 775 988 | 5/1997 |
| FR | 2730575 | 8/1996 |
| WO | WO98/19258 | 5/1998 |

* cited by examiner

*Primary Examiner*—Karl D. Frech
(74) *Attorney, Agent, or Firm*—Burns, Doane, Swecker & Mathis, L.L.P.

(57) ABSTRACT

A method for registration of existing, physical documents determining a code through use of a data processor structure, actuating a marking assembly for applying a mark, which represents the code, on each document to be registered, actuating a registration device in response to the application of the mark through use of the data processor structure, and registering accordingly data corresponding with the code, on a protected information carrier. Because it is one and the same data processor structure that carries out the determination of the code, the application of a mark corresponding with the code, and the storage, in a protected memory, of codes that correspond with applied marks, a safeguard regarding the authenticity of stored data regarding documents is obtained in a highly efficient and reliable manner.

30 Claims, 2 Drawing Sheets

SYSTEM AND METHOD FOR REGISTRATION OF DOCUMENTS BY MARKING AND REGISTRATION OF MARKINGS

FIELD AND BACKGROUND OF THE INVENTION

This invention relates to a method and a system for registering existing documents.

It is generally common to register received and sent documents to be able to prove which documents have been received and sent. In doing so, customarily, data regarding documents are registered. Documents, such as incoming mail, are moreover provided with a stamp to indicate that a document has been registered and when it has been registered. Recording the existence of a document and the time when the document has become available is also of importance for other applications, such as for registering declarations such as proces-verbaux and for determining the date of transactions.

Maintaining such an administration is very time-consuming and for many applications such an administration is not sufficiently protected from modification afterwards. Particular problems are proving the authenticity, or at least the authentic contents of documents, proving the time of registration of a document, and proving non-receipt of a document.

SUMMARY OF THE INVENTION

It is an object of the invention to provide a solution which enables registering documents in a simpler manner.

According to the present invention, this object is achieved by providing a system for registering existing, physical documents, having a data processor structure arranged for determining codes; a marking assembly coupled to the data processor structure, for providing each document to be registered, or a physical or digital representation thereof, with at least one mark which represents one of the codes, a protected information carrier; and registration means coupled to the data processor structure, for registering a code of the codes that corresponds with at least one applied mark, on or in the information carrier, in response to the application of the at least one mark. To this end, the invention further provides a method for registering existing, physical documents, wherein in each case a code is determined by a data processor structure; a marking assembly is actuated for applying at least one mark, which represents the code, on each document to be registered; in response to the application of the at least one mark, registration means are actuated by the data processor structure; and accordingly data corresponding with the code are registered on a protected information carrier.

Because it is one and the same data processor structure that carries out the determination of the code, the application of a mark corresponding with the code, and the storage, in a protected memory, of codes of the codes that correspond with applied marks, a safeguard in respect of the authenticity of stored data regarding documents is obtained in a highly efficient and reliable manner.

The marking assembly can be designed in many ways, for instance in the form of a printer, a perforator, an embossing station, a branding element or a device for applying labels.

Further objects, embodiments, details and advantages of the invention are apparent from the claims and the following description, in which reference is made to the accompanying drawings.

DETAILED DESCRIPTION

Figure 1:
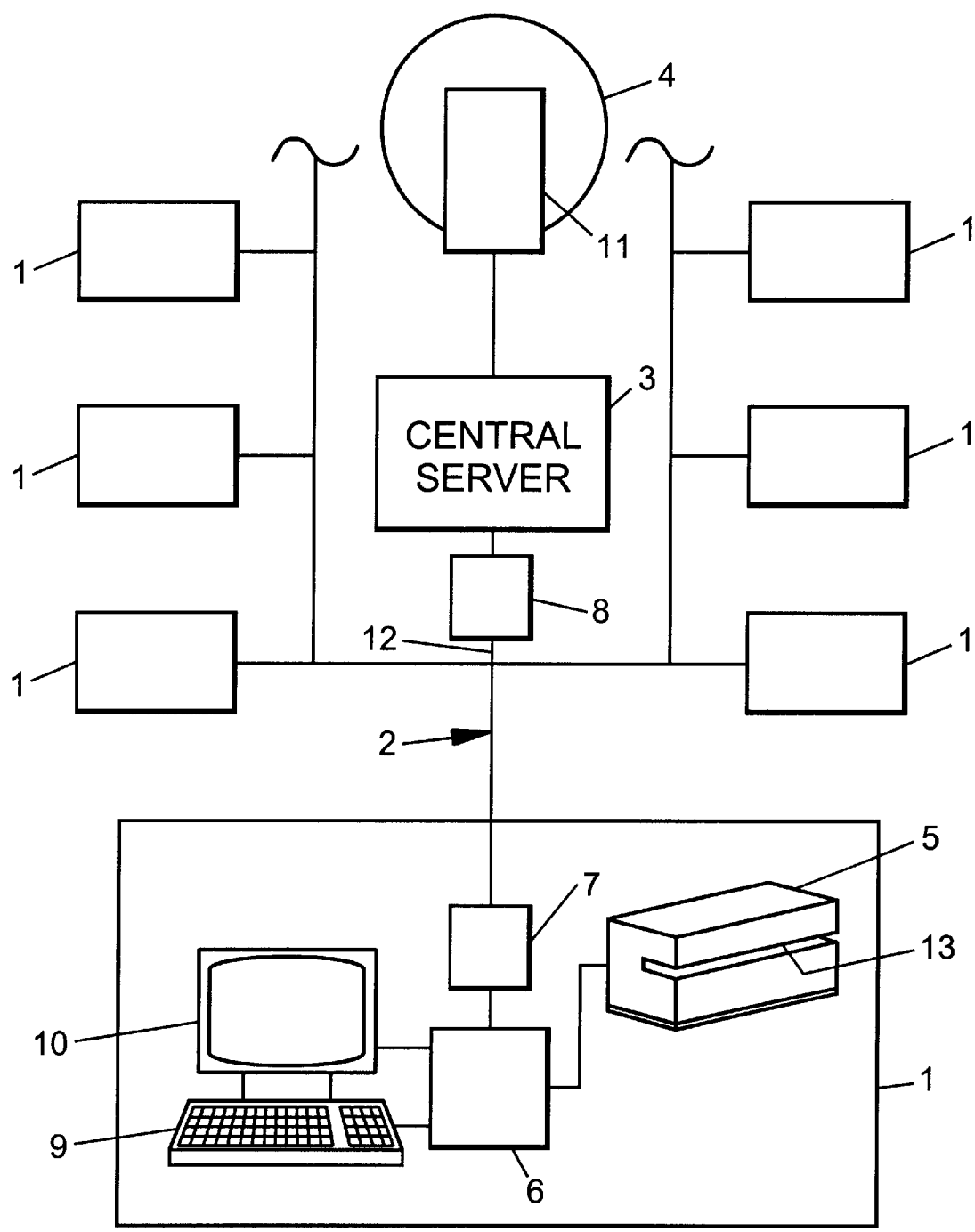
FIG. 1 is a diagrammatic representation of a system according to a first exemplary embodiment of the invention.

The exemplary embodiment of the invention shown in FIG. 1 is currently preferred most. This system is suitable for use by a plurality of users each utilizing a client-bound system 1 of the system. Of these client-bound systems, one will be described hereinafter in more detail. The others are basically identical. It is possible that one or more of the client-bound systems in turn consist of a server having connected to it a plurality of stations which can utilize the registration facility of the system according to the invention.

These client-bound systems 1 are connected via a generally accessible network 2, such as a telephone network, a data transmission network or a combination thereof, with a central data processor 3, which is coupled to a protected data storage 4. The central data processor 3 and the protected data storage 4 are preferably managed by a central certifying authority which guarantees the authenticity of data stored in the data storage 4 and at which authority users can subscribe to the certification of their document registration. Such an authority can be, for instance, a postal organization, a civil-law notary office, or a certification bureau. As a generally accessible network, the network does not form part of the system that is arranged and offered especially for registering documents, even though use is made of it. It is also possible, however, to arrange for the transfer of data between the central processor 3 and the user systems 1, for instance, by the transfer of information carriers such as diskettes, from the client-bound systems 1 to the central data processor vice versa or by radio transmission.

The data processor structure is arranged for generating and issuing codes that can be coupled by users to documents to be registered. The client-bound systems are each made up of at least one marking assembly 5, which is coupled to a local data processor 6, which is coupled to the central data processor via a suitable local interface 7, such as a modem or an adapter, and a suitable central interface a, such as a system of modems and/or adapters. The central data processor and the distributed local data processors together form a data processor structure which issues the codes to be used and registers codes which have been used. For operating the local data processor 6, the marking assembly 5 and for managing communication with the central data processor 3, the local data processor 6 is coupled to an operating interface consisting of a keyboard 9 and a display 10.

The marking assembly 5 and the local data processor 6 are arranged and coupled for providing each document to be registered with at least one mark which represents one of the generated codes and for generating, in response to the application of a code, instruction signals for registering codes used. Sending those instruction signals to the central data processor for registering used codes can occur in accordance with the accuracy requirements, the allowable costs and the structure of the use, continuously on-line or batchwise (for instance, each time when the incoming morning mail has been processed). The central data processor is arranged for controlling registration means 11 in response to the receipt of instruction signals indicating that marks corresponding with certain codes have been applied, these registration means 11 being coupled to the central data processor 3 for storing on the information carrier 4 the codes that correspond with applied marks.

Communication between the central processor 3 and the distributed local data processors 6 as well as between the distributed local data processors 6 and the associated mark assemblies 5 preferably proceeds in encrypted form, so that it is guaranteed that codes in respect of which it is reported that corresponding marks have been applied have in fact been applied and that no marks can be applied without the corresponding codes being registered at the central data processor.

Issuing codes and safeguarding the authenticity can be done, for instance, in broadly the same manner as described in European patent application with publication number 0 775 988 for the on-line settlement of franking amounts depending on postage applied. More particularly, upon request, in a protected manner, a number of codes can be furnished by the central authorities. Instead of charging amounts in accordance with applied postage, however, a temporary register with applied codes can be generated, which codes to be registered centrally are passed on to the central data processor 3 when a new set of codes is being applied for. Further, codes associated with applied marks are registered centrally in a protected carrier, so that later, if desired, it can be verified whether a mark on a document is real and whether a particular number of documents do indeed constitute the total of documents received, or at least registered, on a particular day. Because for a large part the same apparatuses as for franking can be used, it is particularly appealing to combine the registration of, for instance, received documents in the proposed manner with franking in a manner which is known from the European patent application mentioned.

Since the application of the marks is coupled automatically, without human intervention, to the registration of codes representing the applied marks, the registration of documents can be carried out very simply and be properly protected against unauthorized intervention. Preferably, data of contents are also coupled to the data to be registered. it is also possible, however, to store such data separately and optionally in a less well protected manner. In fact, the applied marks make it possible to prove afterwards whether a particular document is indeed the document to which the registration relates.

The proposed data processor structure with a central data processor unit 3 for generating unique codes, with a client-bound data processor unit 6 remote from the central data processor unit 3 and coupled to the marking assembly 5, and with communication means 7, 8 coupled to the central data processor unit 3 and the client-bound data processor unit 6 for communication between the central data processor unit 3 and the client-bound data processor unit 6 via a communication network 2 then enables a registration of used codes that is particularly reliable and very effectively protected against modification or erasure.

Owing to the central data processor 3 being connected and arranged for cooperation with a plurality of distributed client-bound data processor units 6 which are operatively coupled to the central data processor unit 3, efforts towards the protected registration of codes represented by applied marks can be divided over a plurality of users, which limits the Costs per user of the certification of document registration.

For achieving a protected registration, it is advantageous if each of the codes associated with a document is unique.

It can thus be made substantially more difficult for any third party to predict what a mark for a document should look like without a code having been used for generating that mark.

For a reliable protection of the register of codes that are associated with applied marks, it is further advantageous if the registration means 11 are controlled exclusively by the central data processor unit 3. To that end, in the proposed data processor structure, the central data processor unit 3 is coupled between an associated one of said connections 12 and the registration means 11 for providing access to the registration means 11 exclusively via the central data processor unit 3. The central data processor unit 3 thus forms a shield against unauthorized access to the registration means.

Although the marking assembly 5 can be designed in many different ways, it is preferably designed as an electrostatic or inkjet printer, because such printers can be advantageously used for the computer-controlled printing of symbols with a high resolution. This last is of importance to be able to apply small symbols that still contain sufficient information to accommodate effectively encrypted information in them. The marking assembly 5 comprises a slot 13 through which an edge portion of a document to be marked can be passed for providing marks thereon. On opposite sides of the slot 13, transport rollers are arranged for controlling the feed-through speed of documents that are being marked. Such constructions are known in the field of franking machines.

Figure 2:
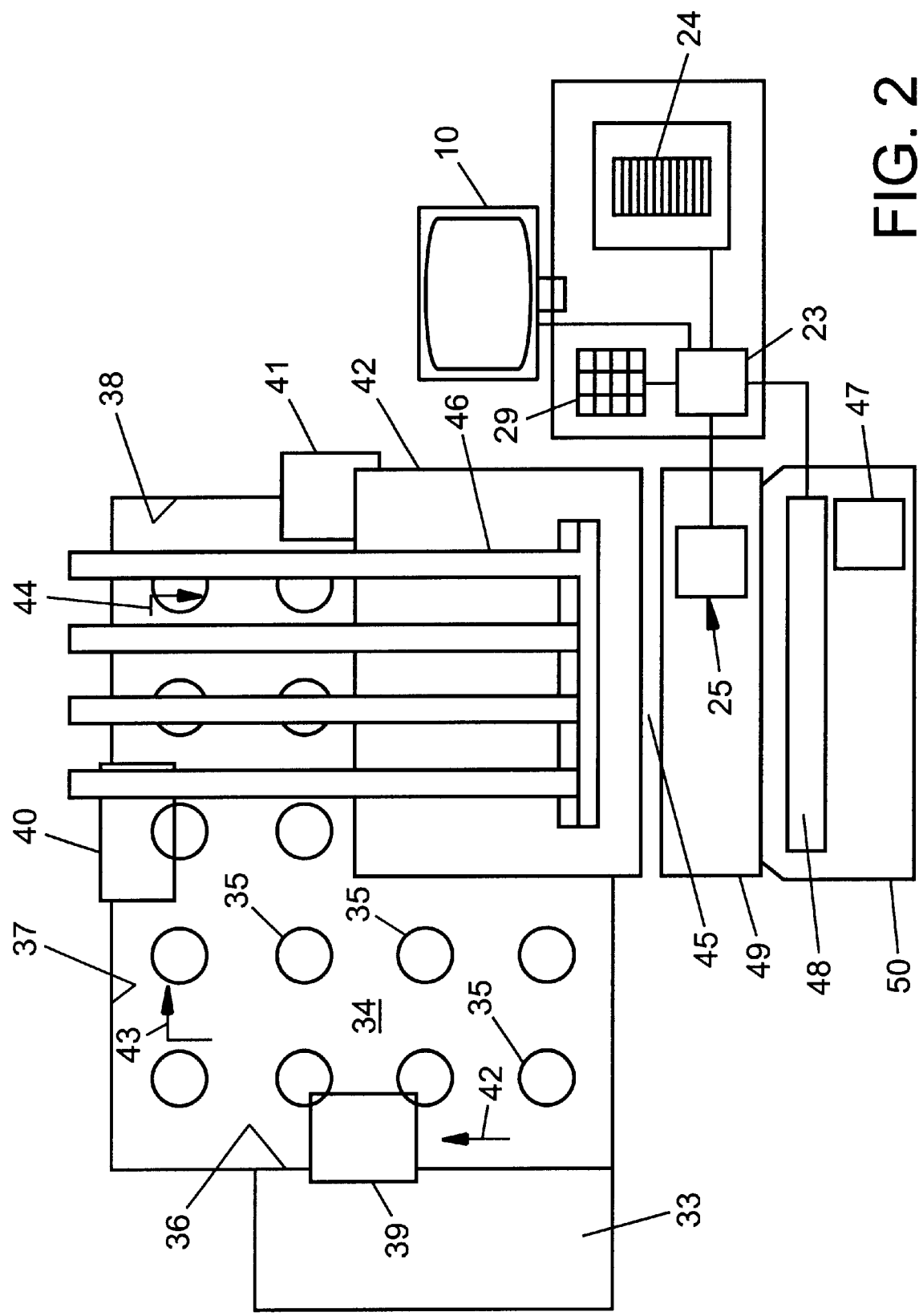
FIG. 2 is a diagrammatic representation of a system according to a second exemplary embodiment of the invention.

FIG. 2 shows a system according to an alternative exemplary embodiment. In this system, the protected information carrier 24 and, coupled thereto, a data processor unit 23 of the data processor structure constitute a separate, protected unit as is known per se, for instance, in the field of electronic franking machines. As a result, a document registration which is better safeguarded and simple to carry out can be obtained without depending to that end on communication with the external world.

The system shown in FIG. 2 comprises an envelope hopper 33 arranged for accommodating a row of standing envelopes and for feeding envelopes one by one to a transport structure with a transport path for serially transporting envelopes. This transport path is formed by a transport table 34 with driven and steerable transport rollers 35 and two transport stations 49, 50. The rollers 35 are coupled to driving and steering assemblies arranged for driving and steering the rollers 35, such that envelopes are displaced successively along a first side edge 36, a rear edge 37 and a second side edge 38.

Located along the first side edge 36, the rear edge 37 and the second side edge 38 are openers 39, 40, 41 for detaching front and rear panels of envelopes from each other along folding edges, which envelopes follow a path indicated by arrows 42, 43, 44.

Located downstream of the openers 39, 40, 41 is an extractor assembly 42 for removing documents from opened envelopes. This extractor has an exit 45 for discharging extracted documents and a discharge path 46 for discharging envelopes. A mail extractor as designated by reference numerals 33–46 and as described hereinabove is commercially available in the form of the Neopost IM 35 Eaziopener. For further details regarding such a mail extractor, reference is made to U.S. Pat. Nos. 5,179,620; 5,175,979; 5,222,585; 5,336,034 and 5,415,266, the contents of which are incorporated herein by reference.

According to this exemplary embodiment, the marking assembly 25 is located downstream of the extractor assembly along the transport structure, for providing extracted documents with marks. The extractor assembly further has an operating mode in which the envelopes, too, are discharged via the exit 45 for documents. This makes it possible, using the marking assembly 25, to provide envelopes with marks too.

The proposed system makes it possible, in operation, fully automatically, to automatically supply envelopes one by one from a row, along a transport path, to detach front and rear panels of each of the envelopes from each other in the transport path along three folding edges, to extract the contents from the envelope and to provide a mark on at least an envelope transported by the transport structure or a document removed therefrom. Thus, a considerable saving on labor is achieved and a very reliable guarantee of the registration of all received documents is achieved.

In order to ensure the authenticity of documents consisting of more than three pages as well, the mark could be applied so as to penetrate the documents, as by perforation. It is preferred, however, to bond the extracted documents together in sealed fashion, which is easier to realize especially in the case of thicker sets of documents and requires less complex and less powerful tools. To that end, the proposed system is provided, downstream of the extractor and the marking assembly, with a bonding station 47 for bonding the extracted documents together in a sealed fashion.

The marking assembly 25 is preferably further arranged for applying postage. To that end, the same protected registration structure can be used as for registering documents provided with marks. If such multiple use is not allowed by the postal authority in question, it is also possible to utilize a data processor structure of structurally analogous makeup with associated registration means and protected information carriers, which then still provides the advantage that the means for handling the postal items and for applying the marks can be used for two purposes. It is, in particular, of importance here that the activity of registering documents in businesses typically occurs in the morning (after the mail has come in), while franking typically occurs at the end of a working day (shortly before postal items prepared during the day are dispatched). Even if the proposed apparatus were not provided with a data processor structure and associated registration means and information storage means for registering documents, combining a device for opening or extracting mail with a franking apparatus arranged along the transport path of that device is advantageous, because for both functions use can be made of the same means for transporting postal items one by one and because the two functions, as set out hereinabove, typically occur during different parts of the day.

If a wholly independent franking unit is used, it is advantageous to design it as a module that can be arranged as a replacement of one of the openers 39–41.

In order not to cut open envelopes to be franked and not to extract the documents therein, the openers 39–41 and the extractor 42 are adapted for deactivation, so that the envelopes, during franking, pass unhindered along the openers 39–41 and the extractor, and are carried via document exit 45 of the extractor 42 to the marking assembly.

For operating both the franking function and the registration function, the data processor unit 23 is coupled to a keyboard 29 and a display 30.

To automatically register data regarding the contents of extracted documents as well, further a scanner 48 is included downstream of the extractor 42, which scanner 48 is arranged for passing and scanning documents (and/or optionally envelopes) supplied from the exit 45. The scanner 48 is coupled to the data processor unit 25 for transferring scanning results which can be supplied by the data processor unit 25 to a registration structure for storing scanning results in the protected memory 24.

To afford protection against the mark being copied, the data processor unit 23 may, for instance, be arranged for preventing the same code being issued twice. Further, the marking assembly may be designed as a printer capable of applying marks protected against reproduction, for instance by making use of magnetizable ink in combination with a magnetization pattern, ink that cannot be copied, or a mechanical seal which in turn carries the mark.

For further enhancing the protection of the authenticity of registered documents, the codes are preferably generated depending on the information content of the document to be registered. To that end, the codes can be generated, for instance, by encryption of the date of receipt in combination with the first three letters of the document or particular properties of the printing pattern of the document in question.

These data can be obtained in different ways. it is possible, for instance, to input them via the keyboard 29. Preferably, however, recording data needed for determining the code is also automated, by scanning the document to be registered at least partly in the scanner 48 and supplying data regarding scanning results generated by the scanner 48 to the data processor Unit 23. Thus, registration codes for the documents to be registered can be determined depending on the scanning results obtained upon scanning.

For protecting the data regarding the contents of the documents, it is advantageous if, using an asymmetrical keying system (encryption system), the scanning results are each processed in accordance with a processing key and are read back using an associated read-back key which is different from said processing key. The read-back key may, for instance, be coupled to the mark applied on the document in question and/or to the associated code. Other ways for certifying the authenticity of digital documents may be used, such as generating digital certificates, digital signatures and/or digital time stamps. Further, it is also possible to provide a mark representing the code in question, not on the registered document, but exclusively on a copy in digital or analog, or electronic or physical form. In that case, too, the advantage is obtained that in response to the application of the mark, the associated code is automatically registered. Such a mark can be incorporated, for instance, in data representing the image of the document. Verification can then occur, for instance, by defining a 7 on the basis of a part of the mark that provides for human visual representation of the code, which verification key must match the stored and processed data representing the image of the document.

We claim:

1. A system for registering existing, physical documents, comprising:

a data processor structure arranged for determining unique codes;

a marking assembly coupled to said data processor structure, for marking each document to be registered, or a physical or digital representation thereof, with at least one mark which represents one of the codes determined by the data processor structure;

a protected information carrier;

registration means coupled to said data processor structure, for registering each of said codes on or in said information carrier, each in response to the marking of one of said documents to be registered, or of said physical or digital representation thereof, with at least one of said markings representing the respective one of said codes; and means for storing said marked documents or said marked physical or digital representation thereof.

2. A system according to claim 1, wherein said protected information carrier and, coupled thereto, at least one data processor unit of said data processor structure form a separate, protected unit.

3. A system according to claim 2, further comprising a scanner for scanning said documents, which scanner is coupled to said data processor structure for transferring scanning results.

4. A system according to claim 3, wherein said data processor structure is arranged for generating said codes depending on said scanning-results.

5. A system according to claim 3, wherein said data processor structure is arranged for processing said scanning results depending on said codes and for reading back processed scanning results associated with a document, using an associated read-back key which is not suitable for carrying out said processing.

6. A system according to claim 1, further comprising:
a transport structure with at least one transport path for serially transporting envelopes, and
at least one opener located along the transport path for detaching front and rear panels of envelopes from each other in the transport path along at least one folding edge,
wherein the marking assembly is located along said transport structure for providing with marks at least envelopes transported by the transport structure or documents removed therefrom.

7. A system according to claim 6, further comprising an extractor located downstream of the opener, for extracting documents from opened envelopes.

8. A system according to claim 7, wherein the marking assembly is located downstream of the extractor.

9. A system according to claim 7, further comprising a bonding station downstream of the extractor, for bonding extracted documents together in sealed fashion.

10. A system according to claim 1, further comprising a protected memory for storing postage value positions.

11. A system according to claim 1, wherein the marking assembly is further arranged for applying postage.

12. A system according to claim 1, wherein the marking assembly is designed as a printer.

13. A system according to claim 1, further comprising an envelope supply-structure for serially feeding envelopes from a stack to the transport structure.

14. A system for registering existing physical documents, comprising:
a data processor structure that determines unique codes;
a marking assembly coupled to said data processor structure, that marks each document to be registered, or a physical or digital representation thereof, with at least one mark representing one of the codes determined by the data processor structure;
a protected information carrier;
registration means coupled to said data processor structure that registers each of said codes on or in said information carrier, each in response to the marking of one of said documents to be registered, or of said physical or digital representation thereof, with at least one of said markings representing the respective one of said codes;
means for storing said marked documents or said marked physical or digital representation thereof; and
said data processor structure comprising a central data processor unit for generating unique codes, and a client-bound data processor unit remote from said central data processor unit and coupled to said marking assembly, and further comprising communication means coupled to said central data processor unit and said client-bound data processor unit for transfer of data between said central data processor unit and said client-bound data processor unit.

15. A system according to claim 14, further comprising a plurality of distributed ones of said client-bound data processor units which in operating condition are coupled to said central data processor unit.

16. A system according to claim 14, wherein said client-bound data processor units and said central data processor unit are each located behind an associated connection to a communication network, and wherein said central data processor unit is coupled between an associated one of said connections and said registration means for providing access to said registration means exclusively via said central data processor unit.

17. A method for registering existing, physical documents, comprising:
determining a unique code for each of a plurality of physical documents to be registered by way of a data processor structure;
actuating a marking assembly for marking each of said documents, or a physical or digital representation thereof, with at least one marking representing one of said codes;
actuating registration means by said data processing structure to register each of said codes on a protected information carrier each in response to the marking of one of said documents to be registered, or of said physical or digital representation thereof, with at least one of said markings representing the respective one of said codes; and
storing said marked document or said marked physical or digital representation thereof.

18. A method according to claim 17, wherein each of said codes associated with a document is unique.

19. A method according to claim 17, wherein the document to be registered is at least partly scanned, and wherein data regarding scanning results generated by the scanner are stored on said protected information carrier.

20. A method according to claim 19, wherein said scanning results are each processed in accordance with a processing key and are read back with the aid of an associated read-back key which is different from said processing key.

21. A method according to claim 20, wherein said code determines said read-back key.

22. A method according to claim 17, wherein the codes are generated depending on the information content of the document to be registered.

23. A method according to claim 22, wherein the document to be registered is at least partly scanned, wherein data regarding scanning results generated by the scanner are supplied to the data processor structure and wherein determining the codes is carried out at least partly depending on a supplied scanning result.

24. A method according to claim 17, further comprising:
serially transporting envelopes along a transport path,
detaching front and rear panels of each of the envelopes in the transport path from each other along at least one folding edge, and applying a mark to at least one opened envelope or a document removed therefrom.

25. A method according to claim 24, further comprising extracting a document from each of the envelopes.

26. A method according to claim 24, further comprising the bonding together of extracted documents in sealed fashion.

27. A method for registering existing, physical documents, comprising:

determining a unique code for each of a plurality of physical documents to be registered by way of a data processor structure;

actuating a marking assembly for marking each of said documents, or a physical or digital representation thereof, with at least one marking representing one of said codes;

actuating registration means by said data processing structure causing registration of each of said codes on a protected information carrier each in response to the marking of one of said documents to be registered, or of said physical or digital representation thereof, with at least one of said markings representing the respective one of said codes;

storing said marked document or said marked physical or digital representation thereof; and said codes being generated in a central data processor unit and being sent to a client-bound data processor unit remote from said central data processor unit, which clientbound data processor unit actuates said marking assembly for applying said mark.

28. A method according to claim 27, wherein said central data processor unit sends codes to a plurality of said client-bound data processor units.

29. A method according to claim 27, wherein said registration means are controlled exclusively by said central data processor unit.

30. A system for registering existing, physical documents, comprising:

a data processor structure arranged for determining unique codes;

a marking assembly coupled to said data processor structure for marking each document to be registered, or a physical or digital representation thereof, with at least one mark which represents one of the unique codes determined by said data processor structure;

a protected information carrier; and registration means coupled to said data processor structure for registering each of said codes on or in said information carrier, each in response to the marking of one of said documents to be registered, or of said physical or digital representation thereof, with at least one of said markings representing the respective one of said unique codes; and means for storing said marked documents, or said marked physical or digital representation thereof;

wherein said data processor structure and said marking assembly are adapted for franking and wherein said registration means comprise a protected memory for storing postage value positions.

* * * * *